(12) United States Patent
Kumar et al.

(10) Patent No.: US 10,005,072 B2
(45) Date of Patent: *Jun. 26, 2018

(54) HIGH MATRIX SURFACE AREA CATALYTIC CRACKING CATALYST STABILIZED WITH MAGNESIUM AND SILICA

(71) Applicant: W. R. GRACE & CO.-CONN., Columbia, MD (US)

(72) Inventors: Ranjit Kumar, Clarksville, MD (US); Wu-Cheng Cheng, Ellicott City, MD (US); Kevin J. Sutovich, Hampstead, MD (US); Michael S. Ziebarth, Columbia, MD (US); Yuying Shu, Ellicott City, MD (US)

(73) Assignee: W. R. GRACE & CO.-CONN, Columbia, MD (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/948,687

(22) Filed: Jul. 23, 2013

(65) Prior Publication Data

US 2014/0021098 A1 Jan. 23, 2014

Related U.S. Application Data

(60) Provisional application No. 61/674,522, filed on Jul. 23, 2012.

(51) Int. Cl.
| | | |
|---|---|---|
| *B01J 29/08* | (2006.01) | |
| *C10G 11/05* | (2006.01) | |
| *C10G 11/18* | (2006.01) | |
| *B01J 21/10* | (2006.01) | |
| *B01J 29/90* | (2006.01) | |

(52) U.S. Cl.
CPC ............ *B01J 29/084* (2013.01); *B01J 21/10* (2013.01); *B01J 29/088* (2013.01); *C10G 11/05* (2013.01); *C10G 11/18* (2013.01); *B01J 29/90* (2013.01); *B01J 2229/20* (2013.01); *B01J 2229/42* (2013.01)

(58) Field of Classification Search
CPC ... B01J 29/084; B01J 2229/20; B01J 2229/42
See application file for complete search history.

(56) References Cited

U.S. PATENT DOCUMENTS

| | | | |
|---|---|---|---|
| 2,971,903 A | 2/1961 | Kimberlin, Jr. et al. | 208/119 |
| 3,140,249 A | 7/1964 | Plank et al. | 208/120 |
| 3,236,762 A | 2/1966 | Rabo et al. | 208/111 |
| 3,293,192 A | 12/1966 | Maher et al. | 252/430 |
| 3,364,135 A | 1/1968 | Hansford et al. | 208/120 |
| 3,410,808 A | 11/1968 | Smith et al. | 252/453 |
| 3,413,238 A | 11/1968 | Gladrow et al. | 252/455 |
| 3,429,830 A | 2/1969 | Ward | 252/453 |
| 3,446,727 A | 5/1969 | Secor | 208/120 |
| 3,449,070 A | 6/1969 | McDaniel et al. | 23/111 |
| 3,449,265 A | 6/1969 | Gladrow et al. | 252/455 |
| 3,459,679 A | 8/1969 | Plank et al. | 252/455 |
| 3,835,031 A | 9/1974 | Bertolacini et al. | 208/120 |
| 4,153,535 A | 5/1979 | Vasalos et al. | 208/120 |
| 4,240,899 A | 12/1980 | Gladrow et al. | 208/120 |
| 4,376,696 A | 3/1983 | Myers | 208/120 |
| 4,458,023 A | 7/1984 | Welsh et al. | 502/65 |
| 4,465,588 A | 8/1984 | Occelli et al. | 208/120 |
| 4,465,779 A | 8/1984 | Occelli et al. | |
| 4,515,902 A | 5/1985 | Shioiri et al. | 502/64 |
| 4,542,118 A | 9/1985 | Nozemack et al. | 502/65 |
| 4,556,478 A | 12/1985 | Shioiri et al. | 208/120 |
| 4,874,729 A | 10/1989 | Klazinga | 502/61 |
| 4,874,730 A | 10/1989 | Klazinga | 502/61 |
| 4,918,036 A * | 4/1990 | Rheaume et al. | 502/66 |
| 4,944,865 A | 7/1990 | Occelli et al. | 208/121 |
| 5,034,362 A | 7/1991 | Chu et al. | 502/60 |
| 5,141,624 A | 8/1992 | Liao et al. | 208/113 |
| 5,173,463 A | 12/1992 | MacEdo | 502/68 |
| 5,286,370 A | 2/1994 | Chu et al. | 208/120 |
| 5,286,693 A | 2/1994 | Ino et al. | 502/68 |
| 5,358,917 A | 10/1994 | Van Veen et al. | 502/66 |
| 5,601,798 A | 2/1997 | Cooper et al. | 423/700 |
| 5,646,082 A | 7/1997 | Tan-no et al. | 502/65 |
| 5,705,142 A | 1/1998 | Tan-no et al. | 423/700 |
| 5,997,729 A | 12/1999 | Itoh | 208/120 |
| 6,045,687 A | 4/2000 | Mignard et al. | 208/111.3 |
| 6,114,267 A | 9/2000 | Ghosh et al. | 502/68 |
| 6,143,057 A | 11/2000 | Bulow et al. | 95/96 |
| 6,159,887 A | 12/2000 | Trujillo et al. | 502/64 |
| 6,214,211 B1 | 4/2001 | Itoh | 208/118 |
| 6,399,530 B1 | 6/2002 | Chen et al. | 502/64 |
| 6,511,933 B1 | 1/2003 | Shibasaki et al. | 502/64 |
| 6,528,447 B1 | 3/2003 | Ghosh et al. | 502/65 |
| 6,716,338 B2 | 4/2004 | Madon et al. | 208/120.01 |
| 6,858,555 B2 | 2/2005 | Shibasaki et al. | 502/64 |
| 6,930,067 B2 | 8/2005 | O'Connor et al. | 502/64 |
| 6,942,783 B2 | 9/2005 | Xu et al. | 208/120.01 |
| 7,033,487 B2 | 4/2006 | O'Connor et al. | 208/120.01 |
| 7,776,775 B2 | 8/2010 | Du et al. | 502/65 |
| 2003/0089640 A1 | 5/2003 | Madon et al. | 208/122 |
| 2003/0173254 A1 | 9/2003 | Chen et al. | 208/120.01 |

(Continued)

FOREIGN PATENT DOCUMENTS

CA 967136 5/1975 ...................... 252/60

OTHER PUBLICATIONS

Sadeghbeigi, Fluid Catalytic Cracking Handbook, Gulf Publ. Co. Houston, 1995, ISBN 0-88415-290-1.

(Continued)

*Primary Examiner* — Renee Robinson
(74) *Attorney, Agent, or Firm* — Charles A. Cross; Beverly J. Artale (57) ABSTRACT

Particulate catalytic cracking catalysts which comprise a zeolite having catalytic cracking ability under catalytic cracking conditions, added silica, a magnesium salt, an alumina containing binder, clay and optionally, a matrix material. The catalytic cracking catalyst has a high matrix surface area and is useful in a catalytic cracking process, in particularly, a fluid catalytic cracking process, to provide increased catalytic activity and improved coke and hydrogen selectivity without the need to incorporate rare earth metals.

58 Claims, 3 Drawing Sheets

(56) References Cited

U.S. PATENT DOCUMENTS

2005/0271582 A1   12/2005  Barea et al. ................. 423/709
2010/0236983 A1    9/2010  Watanabe ................ 208/120.15
2010/0252484 A1* 10/2010  Kumar et al. ........... 208/120.15
2011/0036754 A1*  2/2011  Cheng et al. ............ 208/120.01
2014/0021097 A1    1/2014  Sutovich et al. ........ 208/120.25

OTHER PUBLICATIONS

Venuto and Habib, "Fluid Catalytic Cracking with Zeolite Catalysts," Marcel Dekker, New York 1979, ISBN 0-8247-6870-1.
Boock et al., "Contaminant-Metal Deactivation and Metal-Dehydrogenation Effects During Cyclic Propylene Steaming of Fluid Catalytic Cracking Catalysts", ACS Symposium Series 634, 1996 American Chemical Society, pp. 171-183.

* cited by examiner

HIGH MATRIX SURFACE AREA CATALYTIC CRACKING CATALYST STABILIZED WITH MAGNESIUM AND SILICA

CROSS-REFERENCE TO RELATED APPLICATIONS

This application claims the benefit of the filing date of U.S. Provisional Patent Application No. 61/674,522 filed Jul. 23, 2012, the disclosure of which is hereby incorporated by reference.

FIELD OF THE INVENTION

The present invention relates to novel magnesium and silica containing high matrix surface area catalytic cracking catalysts having high catalytic activity and good selectivity for coke and hydrogen, the process of preparing the catalysts, and the process of using the catalysts during a catalytic cracking process.

BACKGROUND OF THE INVENTION

Catalytic cracking is a petroleum refining process that is applied commercially on a very large scale. A majority of the refinery petroleum products are produced using the fluid catalytic cracking (FCC) process. An FCC process typically involves the cracking of heavy hydrocarbon feedstocks to lighter products by contacting the feedstock in a cyclic catalyst recirculation cracking process with a circulating fluidizable catalytic cracking catalyst inventory consisting of particles having a mean particle size ranging from about 50 to about 150 μm, preferably from about 50 to about 100 μm.

The catalytic cracking occurs when relatively high molecular weight hydrocarbon feedstocks are converted into lighter products by reactions taking place at elevated temperature in the presence of a catalyst, with the majority of the conversion or cracking occurring in the vapor phase. The feedstock is converted into gasoline, distillate and other liquid cracking products as well as lighter gaseous vaporous cracking products of four or less carbon atoms per molecule. The vapor partly consists of olefins and partly of saturated hydrocarbons. The products also include bottoms and coke deposited on the catalyst during hydrocarbon cracking. It is desirable to produce the lowest bottoms at a constant coke level.

FCC catalysts normally consist of a range of extremely small spherical particles. Commercial grades normally have average particle sizes ranging from about 45 to 200 μm, preferably from about 50 to about 150 μm. FCC catalysts are generally composed of zeolite, matrix, clay and binder. The cracking catalysts may be comprised of a number of components incorporated into a single particle or blends of individual components having different functions.

Rare earth metals have been widely used as a component of FCC catalyst to provide catalysts having enhanced activity and hydrothermal zeolite stability with increased yield performance. The level of rare earth metals in a specific catalyst formulation is determined by operational severity and product objectives. However, the need for increased amounts of gasoline and the necessity to process heavy crudes containing high metal contents have led to an increase in the level of rare earths in FCC catalyst formulations over time. The amount of rare earth metal typically used in the FCC catalyst ranges from about 0.5 to about 6 wt % of the total FCC catalyst formulations.

Recently, China, which produces 95% of the world's supply of rare earth metals, has severely cut its export of precious rare earth metals, causing a troubling increase in catalyst costs. The refining industry has instinctively reacted by opting for lower rare earth catalyst formulations to offset costs of the raw materials. Such action offers immediate and successful cost savings. However, reduced rare earth levels can have a significant impact on catalyst performance, e.g. in reduced catalyst activity, stability and yields, thereby affecting bottom-line profit generation.

Consequently, there exists a need in the FCC refining industry for rare earth free catalytic cracking catalysts that provide a catalytic activity and selectivity comparable to or improved over conventional rare earth containing FCC catalysts during a catalytic cracking process.

SUMMARY OF THE INVENTION

The present invention encompasses the discovery that the combination of an added silica source and a magnesium salt in certain catalytic cracking catalyst compositions, in particularly high matrix surface area FCC catalyst compositions, is very effective to provide compositions having increased catalytic activity and improved coke and hydrogen selectivity without the need to incorporate rare earth metals. Catalytic cracking catalysts of the invention advantageously offers increased cost savings while providing enhanced catalyst activity and selectivity comparable to catalyst activity and selectivity obtainable using conventional rare earth containing zeolite based FCC catalysts.

Catalyst compositions in accordance with the present invention generally comprise at least one zeolite component having catalytic cracking activity under FCC conditions, at least one added silica component, a magnesium salt, clay, an alumina containing binder and optionally, a matrix material. The catalyst compositions have a high matrix surface area, e.g. greater than 60 $m^2/g$, and possess an added silica to magnesium molar ratio ranging from about 2 to greater than 2.

In accordance with the present invention, the catalyst compositions of the invention are prepared by a process comprising spray drying an aqueous slurry comprising at least one zeolite component having catalytic cracking activity, an added silica source, clay, an alumina containing binder and optionally, a matrix material in an amount sufficient to provide catalyst particles. The spray-dried catalyst particles may optionally be calcined and/or optionally washed with an aqueous solution to reduce the content of $Na_2O$ and other salts. The catalyst particles are thereafter treated with an aqueous solution of a magnesium salt to provide magnesium salt throughout the pore volume of the catalyst particles.

Accordingly, it is an advantage of the present invention to provide high matrix surface area FCC catalyst compositions stabilized with silica and a magnesium salt, which catalysts have high activity and hydrothermal stability during a FCC process.

It is also an advantage of the present invention to provide magnesium salt and silica stabilized high matrix surface area FCC catalyst compositions which are free of rare earth metals and have high activity and hydrothermal stability during a FCC process.

Another advantage of the present invention is to provide high matrix surface area FCC catalyst compositions which have a specified silica to magnesium oxide molar ratio and which exhibit a high catalytic activity and good coke and hydrogen selectivity during a FCC process.

It is also an advantage of the present invention to provide high matrix surface area FCC catalyst compositions which exhibit improved catalytic activity and good coke and hydrogen selectivity when compared to the activity and selectivity obtainable using a magnesium salt containing FCC catalyst composition devoid of an "added silica" during a FCC process.

It is further an advantage of the present invention to provide a process for preparing the high matrix surface area FCC catalysts of the invention.

Another advantage of the present invention is to provide a process of reducing costs during the production of a high matrix surface area FCC catalyst having high activity and improved selectivity during an FCC process while maintaining or enhancing catalyst performance.

It is yet another advantage of the present invention to provide improved FCC processes using compositions and processes in accordance with the present invention.

These and other aspects of the present invention are described in further details below.

DETAILED DESCRIPTION OF THE INVENTION

For purposes of this invention the terms "rare earth" and rare earth metal" are used herein interchangeably to designate metals of the Lanthanide Series of The Periodic Table, and yttrium.

The term "free" as it relates to an amount of rare earth or rare earth metal is used herein to indicate less than 0.3 wt % of rare earth, measured as the oxide, based on the total weight of the composition.

The term "added silica" as used herein to reference a component of the catalyst composition of the present invention is used to indicate a siliceous oxide which is not present in any clay, binder or zeolite component of the catalyst.

The phrase "catalytic cracking activity" is used herein to indicate the ability of a compound to catalyze the conversion of hydrocarbons to lower molecular weight compounds under catalytic cracking conditions.

The phrase "catalytic cracking conditions" is used herein to indicate the conditions of a typical catalytic cracking process, in particularly an FCC process wherein a circulating inventory of cracking catalyst is contacted with a heavy hydrocarbon feedstock at elevated temperature, e.g. from about 480° C. to about 700° C., to convert the feedstock into lower molecular weight compounds.

Catalyst compositions of the invention typically comprise particulate compositions comprising at least one zeolite component having catalytic cracking activity under FCC conditions, at least one added silica component, clay, an alumina containing binder and optionally, a matrix material. The particulate catalyst compositions have been treated with magnesium salt, expressed as the oxide, to give a final catalytic cracking catalyst. Catalyst compositions of the invention have a high matrix surface area and possess a specified added silica to magnesium oxide molar ratio.

The zeolite component useful to prepare the particulate compositions of the invention may be any zeolite which has catalytic cracking activity under fluid catalytic cracking conditions and which is free or substantially free of rare earth metal containing compounds. Typically the zeolitic component is a synthetic faujasite zeolite. In a preferred embodiment of the invention, the zeolite component is Y-type zeolite, such as USY. It is also contemplated that the zeolite component may comprise a mixture of zeolites such as synthetic faujasite in combination with mordenite and the ZSM type zeolites. Generally, the zeolite component comprises from about 10 wt % to about 50 wt % of the cracking catalyst. In one embodiment of the invention, the zeolite component comprises from about 12 wt % to about 40 wt % of the catalyst composition. In another embodiment of the invention, the zeolite component comprise from about 15 wt % to about 35 wt % of the catalyst composition.

In one embodiment of the invention, the zeolite component in the final catalyst composition has a $Na_2O$ content sufficient to provide less than about 1.0 wt %, preferably less than about 0.8 wt % $Na_2O$, on a zeolite basis, in the total catalyst composition.

In a preferred embodiment of the invention, the zeolite component has a $Na_2O$ content sufficient to provide less than 0.7 wt %, preferably less than about 0.5 wt %, most preferably less than about 0.3 wt %, $Na_2O$, on a zeolite basis, in the total catalyst composition.

For purposes of the present invention, the term "on a zeolite basis" assumes that all of the soda in the catalyst is associated with or on the zeolite. Accordingly, a catalyst containing 0.30 wt % $Na_2O$ and 30 wt % zeolite, for example, will be expressed as containing 1 wt % $Na_2O$ on a zeolite basis.

Added silica components useful in the compositions of the invention may be any siliceous oxide used as a component of the matrix or added separately as a component in the form of a solid, slurry or sol. As noted above, the term "added silica" does not include a siliceous oxide present in any clay, binder or zeolite component of the catalyst. In one embodiment of the invention, the added silica component comprises a silica component which includes, but is not limited to, precipitated silica, silica gel, colloidal silica, or combinations thereof. It is also within the scope of the invention that the added silica component will include silica contained in a particulate silica alumina provided however that the silica alumina comprise greater than 60 wt % silica, preferably, greater than 75 wt % silica, most preferably greater than 80 wt % silica, based on the total weight of the silica alumina. Typically, the added silica component is present in the catalyst compositions of the invention in an amount sufficient to provide at least about 5 wt % silica based on the total weight of the catalyst composition. In one embodiment of the invention, catalysts of the invention comprise an amount of added silica sufficient to provide from about 5 wt % to about 30 wt % silica based on the total weight of the catalyst composition. In another embodiment of the invention, added silica is present in the catalyst of the invention in an amount sufficient to provide from about 8 wt % to about 25 wt % silica based on the total weight of the catalyst composition.

Generally, catalyst compositions of the invention comprise an added silica to magnesium oxide molar ratio of about 2 or greater than 2. In one embodiment of the invention, catalyst compositions of the invention have an added silica to magnesium oxide molar ratio ranging from about 2 to about 40. In yet another embodiment of the invention, catalyst compositions in accordance with the present invention have an added silica to magnesium oxide molar ratio ranging from about 4 to about 30.

Binder materials useful to prepare the particulate compositions of the invention include any inorganic binder which is capable of binding a zeolite powder to form particles having properties suitable for use in the FCC unit under FCC process conditions and which contains greater than 50 wt % alumina. In a preferred embodiment of the invention, the binder contains greater than 95 wt % alumina. Typical inorganic binder materials useful to prepare compositions in accordance with the present invention include, but are not limited to, alumina sol, peptized alumina, silica alumina containing less than 50 wt % silica, or mixtures thereof. In a preferred embodiment of the invention, the binder is selected from the group consisting of alumina sol, peptized alumina and mixtures thereof. In a more preferred embodiment of the invention, the binder comprises an acid or base peptized alumina. In an even more preferred embodiment of the invention, the binder comprises an alumina sol, e.g., aluminum chlorohydrol.

Generally, the amount of binder material present in the particulate catalyst compositions of the present invention comprises from about 10 wt % to about 60 wt %, preferably from about 15 wt % to about 50 wt %, most preferably from about 20 wt % to about 40 wt %, based on the total weight of the catalyst composition.

The invention catalyst further includes a clay component. While kaolin is the preferred clay component, it is also contemplated that other clays, such as modified kaolin (e.g. metakaolin) may be optionally included in the invention catalyst. The clay component will typically comprise from about 5 wt % to about 65 wt % of the total weight of the catalyst composition. In a preferred embodiment of the invention, the amount of the clay component ranges from about 25 wt % to about 55 wt % of the total weight of the catalyst composition.

Catalyst compositions of the invention may optionally comprise at least one or more matrix material. Suitable matrix materials are selected from the group consisting of non-peptized alumina, zirconia, titania, and combinations thereof. In a preferred embodiment, the matrix material is non-peptized alumina. The matrix material may be present in the invention catalyst in an amount ranging from about 1 wt % to about 70 wt % of the total catalyst composition. In one embodiment of the invention, the matrix material comprises from about 5 wt % to about 50 wt % of the total catalyst composition.

Compositions of the invention have a high matrix surface area, that is, the catalyst compositions have a matrix surface area of greater than 60 m$^2$/g. In one embodiment of the invention, the matrix surface area is greater than 80 m$^2$/g. In another embodiment of the invention, the matrix surface area is greater than 90 m$^2$/g.

The particle size and attrition properties of the invention catalyst affect fluidization properties in the catalytic cracking unit and determine how well the catalyst is retained in the commercial unit, especially in an FCC unit. The catalyst composition of the invention typically has a mean particle size of about 45 μm to about 200 μm. In a preferred embodiment of the invention, the catalyst composition has a mean particle size of about 55 μm to about 150 μm.

Catalyst compositions in accordance with the present invention have good attrition properties as indicated by a Davison Index (DI) of less than 30. In a preferred embodiment of the invention, the catalyst compositions have a DI of less than 20. In a more preferred embodiment of the invention, the catalyst compositions have a DI of less than 15.

Catalyst compositions of the invention may be formed by any conventional method heretofore used in the catalyst art to form particulate FCC catalyst compositions. Generally, catalyst compositions of the invention are prepared by forming a homogeneous or substantially homogeneous aqueous slurry which contains a catalytically active zeolite component, an added silica component, an alumina containing binder, clay, and optionally, at least one matrix material in an amount sufficient to provide a final catalyst composition which comprises about 10 to about 50 wt % of the catalytically active zeolite component, about 5 wt % to about 30 wt % of a added silica component, about 10 wt % to about 60 wt % of binder, from about 5 wt % to about 80 wt % of clay, and optionally, about 1 wt % to 70 wt % of matrix material, said weight percentages being based on the total catalyst composition. In a preferred embodiment of the invention, the aqueous slurry is milled to obtain a homogeneous or substantially homogeneous slurry, i.e. a slurry wherein all the solid components of the slurry have an average particle size of less than 10 μm. Alternatively, the components forming the slurry may be milled prior to forming the slurry. The aqueous slurry is thereafter mixed to obtain a homogeneous or substantially homogeneous aqueous slurry.

The aqueous slurry is thereafter subjected to a spray drying step using conventional spray drying techniques to form catalyst particles. Following spray drying, the catalyst particles may be optionally calcined at a temperature and for a time sufficient to remove volatiles. When calcined, the catalyst particles are calcined at a temperature ranging from about 150° C. to about 800° C. for a period of about 10 minutes to about 2 hours. In a preferred embodiment of the invention, the catalyst particles are calcined at a temperature of about 300° C. for about 650° C. for about 15 minutes to about 1 hour.

The catalyst particles may be optionally washed in an aqueous solution prior to treatment with magnesium to remove ions, i.e. sodium and sulfates ions. In a preferred embodiment of the invention, the aqueous wash solution contains ammonia and/or salts of ammonia.

Subsequently, the catalyst particles are treated with a magnesium salt in a manner sufficient to distribute the magnesium salt throughout the catalyst particles. Magnesium salts useful in the present invention include any soluble magnesium salt which is capable of forming a solution in an appropriate solvent which may be removed readily in a subsequent drying step. In a preferred embodiment of the invention, the solvent is water and the magnesium salt is a water-soluble magnesium salt which includes, but is not limited to, acetates, nitrates, sulfates, chlorides or combinations thereof. In a more preferred embodiment of the invention, the magnesium salt is magnesium sulfate.

Treatment of the catalyst particles may be accomplished by any conventional means known to one skilled in the arts. For example, treatment of the particles may be performed by contacting the catalyst particles with an aqueous solution of the magnesium salt in an amount sufficient to completely wet the particles and distribute magnesium oxide over the surface and into the pores of the catalyst particles. In a preferred embodiment of the invention, an aqueous magnesium salt containing solution is contacted with the catalyst particles in a manner sufficient to fill or substantially fill (i.e. at least 90%) the pores of the particles. In a more preferred embodiment of the invention, magnesium oxide is distributed uniformly throughout the catalyst particles and the pores of the catalyst particles using impregnation.

The amount of magnesium salt in the aqueous solution will vary depending upon the amount of magnesium oxide desired on the final catalyst composition. Generally, the amount of magnesium salt will be an amount sufficient to provide at least 0.2 wt %, based on the total weight of the catalyst, of magnesium salt, expressed as the oxide, in the final catalyst. In one embodiment of the invention, the amount of magnesium in the aqueous solution will be an amount sufficient to provide from about 0.2 wt % to about 5.0 wt %, based on the total weight of the catalyst, of magnesium salt, expressed as the oxide, in the final catalyst. In another embodiment of the invention, the amount of magnesium in the aqueous solution will be an amount sufficient to provide from about 0.5 wt % to about 3.0 wt %, based on the total weight for the catalyst, of magnesium salt, expressed as the oxide, in the final catalyst. In yet another embodiment of the invention, the amount of magnesium salt in the aqueous solution will be an amount sufficient to provide from about 0.8 wt % to about 2.0 wt %, based on the total weight of the catalyst, of magnesium salt, expressed as the oxide, in the final catalyst.

The magnesium salt containing particles are thereafter dried at about 100° C. to about 600° C. for about a second to about 2 hours to form high matrix surface area catalyst particles in accordance with the invention.

The primary components of catalyst compositions of the present invention comprise a catalytically active zeolite, an added silica component, an alumina containing binder, clay, optionally matrix material, and magnesium salt.

It is further within the scope of the present invention that catalyst compositions of the invention may be used in combination with other catalysts and/or additives conventionally used in catalytic cracking process, in particularly FCC processes, e.g. $SO_x$ reduction additives, $NO_x$ reduction additives, gasoline sulfur reduction additives, CO combustion promoters, additives for the production of light olefins, and the like.

Cracking catalyst compositions of the invention are useful in conventional FCC processes or other catalytic cracking processes where hydrocarbon feedstocks are cracked into lower molecular weight compounds. Somewhat briefly, the FCC process involves the cracking of heavy hydrocarbon feedstocks to lighter products by contact of the feedstock in a cyclic catalyst recirculation cracking process with a circulating fluidizable catalytic cracking catalyst inventory consisting of particles having a mean particle size from about 45 to about 200 μm, preferably from about 55 μm to about 150 μm. The catalytic cracking of these relatively high molecular weight hydrocarbon feedstocks results in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is regenerated in a catalyst regeneration zone to produce hot, regenerated catalyst, which is then recycled to the cracking zone for cracking further quantities of feed.

Typical FCC processes are conducted at reaction temperatures of about 480° C. to about 700° C. with catalyst regeneration temperatures of about 600° C. to about 800° C. As it is well known in the art, the catalyst regeneration zone may consist of a single or multiple reactor vessels. The compositions of the invention may be used in FCC processing of any typical hydrocarbon feedstock. The amount of the composition of the invention used may vary depending on the specific FCC process. Typically, the amount of the catalyst composition used is at least 0.05 wt % of the total cracking catalyst inventory. In a preferred embodiment of the invention, the amount of the catalyst composition used ranges from about 1.0 to about 100 wt % of the total cracking catalyst inventory. When used as a blend with other FCC catalysts and/or additives, the catalyst compositions of the invention are preferably used in an amount ranging from about 15 wt % to about 99 wt % of the total cracking catalyst inventory.

Cracking catalyst compositions of the invention may be added to the circulating FCC catalyst inventory while the cracking process is underway or they may be present in the inventory at the start-up of the FCC operation. Alternatively, the catalyst particles may be added directly to the cracking zone, to the regeneration zone of the FCC cracking apparatus, or at any other suitable point in the FCC process.

As stated herein above, it is within the scope of the invention to use the cracking catalyst compositions of the invention alone or in combination with other conventional FCC catalysts which include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type zeolite acid site active component, one or more matrix aluminas and/or silica aluminas, and clays, such as kaolin clay. The Y zeolite may be present in one or more forms and may have been ultra stabilized and/or treated with stabilizing cations such as any of the rare earths. It is also within the scope of the present invention that the FCC catalyst comprises a phosphorous stabilized zeolite having catalytic cracking activity, e.g. phosphorous stabilized Y type zeolite.

Catalyst compositions in accordance with the invention may be used to crack any typical hydrocarbon feedstocks, including but not limited to, hydrotreated vacuum gas oils and non-hydrotreated vacuum gas oils. Cracking catalyst compositions of the invention are useful for cracking hydrocarbon feedstocks containing heavy resid petroleum feeds with typically higher boiling point distribution and higher Conradson carbon content as compared to typical gas oils.

Compositions of the invention offer the advantages of immediate cost savings in the preparation and use of FCC catalysts and increased catalytic activity and improved selectivity for coke and hydrogen during a FCC process. Catalysts of the invention eliminate the need for costly rare earth components to achieve a catalyst performance comparable to rare earth containing FCC catalyst compositions.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Preparation of 0 wt %, 5 wt %, 10 wt %, 15 wt %, and 20 wt % SiO2 Containing MgO Catalyst Bound by Peptized $Al_2O_3$

Example 1: (5 wt % Added $SiO_2$)

An aqueous slurry containing 2000 g of LSUSY (dry basis), 3500 g of peptized $Al_2O_3$ (dry basis), and 4000 g of clay (dry basis), 500 g colloidal $SiO_2$ (dry basis), was mixed and then milled in a Drais Mill. The milled slurry was spray dried in a Bowen spray dryer. The spray dried material was calcined for 40 minutes at 400° C. The calcined material was then washed to remove sodium and sulfate ions. The slurry was filtered, and cake was split in the two parts. One part was impregnated with enough $MgSO_4$ solution to result in 0.8 wt % MgO on the catalyst (Catalyst A). The other part was impregnated with enough $MgSO_4$ solution to result in 1.6 wt % MgO on the catalyst (Catalyst B). The impregnated catalysts were then oven dried at 120° C. The properties of the catalysts are shown in Table 1.

Example 2: (10 wt % Added $SiO_2$)

An aqueous slurry containing 2000 g of LSUSY (dry basis), 3500 g of peptized $Al_2O_3$ (dry basis), and 3500 g of clay (dry basis), 1000 g colloidal $SiO_2$ (dry basis), was mixed and then milled in a Drais Mill. The milled slurry was spray dried in a Bowen spray dryer. The spray dried material was calcined for 40 minutes at 400° C. The calcined material was then washed to remove sodium and sulfate ions. The slurry was filtered, and cake was split in the two parts. One part was impregnated with enough $MgSO_4$ solution to result in 0.8 wt % MgO on the catalyst (Catalyst C). The other part was impregnated with enough $MgSO_4$ solution to result in 1.6 wt % MgO on the catalyst (Catalyst D). The impregnated catalysts were then oven dried at 120° C. The properties of the catalysts are shown in Table 1.

Example 3: (15 wt % Added $SiO_2$)

An aqueous slurry containing 2000 g of LSUSY (dry basis), 3500 g of peptized $Al_2O_3$ (dry basis), and 3000 g of clay (dry basis), 1500 g colloidal $SiO_2$ (dry basis), was mixed and then milled in a Drais Mill. The milled slurry was spray dried in a Bowen spray dryer. The spray dried material was calcined for 40 minutes at 400° C. The calcined material was then washed to remove sodium and sulfate ions. The slurry was filtered, and cake was split in the two parts. One part was impregnated with enough $MgSO_4$ solution to result in 0.8 wt % MgO on the catalyst (Catalyst E). The other part was impregnated with enough $MgSO_4$ solution to result in 1.6 wt % MgO on the catalyst (Catalyst F). The impregnated catalysts were then oven dried at 120° C. The properties of the catalysts are shown in Table 1.

Example 4: (20 wt % Added $SiO_2$)

An aqueous slurry containing 2000 g of LSUSY (dry basis), 3500 g of peptized $Al_2O_3$ (dry basis), and 2500 g of clay (dry basis), 2000 g colloidal $SiO_2$ (dry basis), was mixed and then milled in a Drais Mill. The milled slurry was spray dried in a Bowen spray dryer. The spray dried material was calcined for 40 minutes at 400° C. The calcined material was then washed to remove sodium and sulfate ions. The slurry was filtered, and cake was split in the two parts. One part was impregnated with enough $MgSO_4$ solution to result in 0.8 wt % MgO on the catalyst (Catalyst G). The other part was impregnated with enough $MgSO_4$ solution to result in 1.6 wt % MgO on the catalyst (Catalyst H). The impregnated catalysts were then oven dried at 120° C. The properties of the catalysts are shown in Table 1.

Comparative Example 1: (0 wt % Added $SiO_2$)

2000 g of LSUSY (dry basis), 3500 g of peptized $Al_2O_3$ (dry basis), and 4500 g of clay (dry basis) were mixed and then milled in a Drais mill. The milled slurry was spray dried in a Bowen spray dryer. The spray dried material was calcined for 40 minutes at 400° C. The calcined material was then washed to remove sodium and sulfate ions. The slurry was filtered, and cake was split in the two parts. One part was impregnated with enough $MgSO_4$ solution to result in 0.8 wt % MgO on the catalyst (Comparative Catalyst 1A). The other part was impregnated with enough $MgSO_4$ solution to result in 1.6 wt % MgO on the catalyst (Comparative Catalyst 1B). The impregnated catalysts were then oven dried at 120° C. The properties of the catalysts are shown in Table 1.

TABLE 1

Chemical and Physical Properties of Mg Containing Catalyst with Different Amounts of Added Silica

|  | Catalyst A | Catalyst C | Catalyst E | Catalyst G | Comparative Catalyst 1A | Catalyst B | Catalyst D | Catalyst F | Catalyst H | Comparative Catalyst 1B |
|---|---|---|---|---|---|---|---|---|---|---|
| Molar Free $SiO_2/MgO$ | 4.2 | 8.7 | 12.7 | 17.2 | 0.0 | 2.2 | 4.4 | 6.4 | 8.6 | 0.0 |
| $Al_2O_3$, wt % | 53.5 | 50.6 | 48.4 | 46.7 | 56.5 | 52.4 | 52.1 | 49.2 | 47.4 | 55.0 |
| $Na_2O$, wt % | 0.13 | 0.14 | 0.15 | 0.18 | 0.12 | 0.13 | 0.14 | 0.16 | 0.19 | 0.13 |
| MgO, wt % | 0.80 | 0.80 | 0.79 | 0.78 | 0.84 | 1.52 | 1.53 | 1.56 | 1.56 | 1.61 |
| $RE_2O_3$, wt % | 0.06 | 0.03 | 0.03 | 0.03 | 0.05 | 0.04 | 0.04 | 0.03 | 0.03 | 0.05 |
| ZSA, $m^2/g$ | 137 | 133 | 129 | 130 | 142 | 135 | 129 | 128 | 122 | 141 |
| MSA, $m^2/g$ | 137 | 147 | 160 | 162 | 127 | 131 | 143 | 157 | 154 | 126 |
| CPS Deactivation |  |  |  |  |  |  |  |  |  |  |
| Ni ppm | 2106 | 2190 | 2068 | 2165 | 2224 | 2122 | 2301 | 2280 | 2120 | 2168 |
| V ppm | 3260 | 3260 | 3200 | 3160 | 3350 | 3260 | 3260 | 3340 | 3280 | 3450 |
| Cell Size, Å | 24.26 | 24.27 | 24.26 | 24.26 | 24.26 | 24.29 | 24.30 | 24.29 | 24.29 | 24.26 |
| ZSA, $m^2/g$ | 54 | 67 | 73 | 81 | 35 | 42 | 52 | 60 | 64 | 26 |
| MSA, $m^2/g$ | 95 | 100 | 109 | 111 | 89 | 92 | 95 | 104 | 106 | 86 |
| ZSA retention, % | 39.4 | 50.4 | 56.6 | 62.3 | 24.6 | 31.1 | 40.3 | 46.9 | 52.5 | 18.4 |

Example 5: ACE Evaluation of Catalysts

Figure 1:
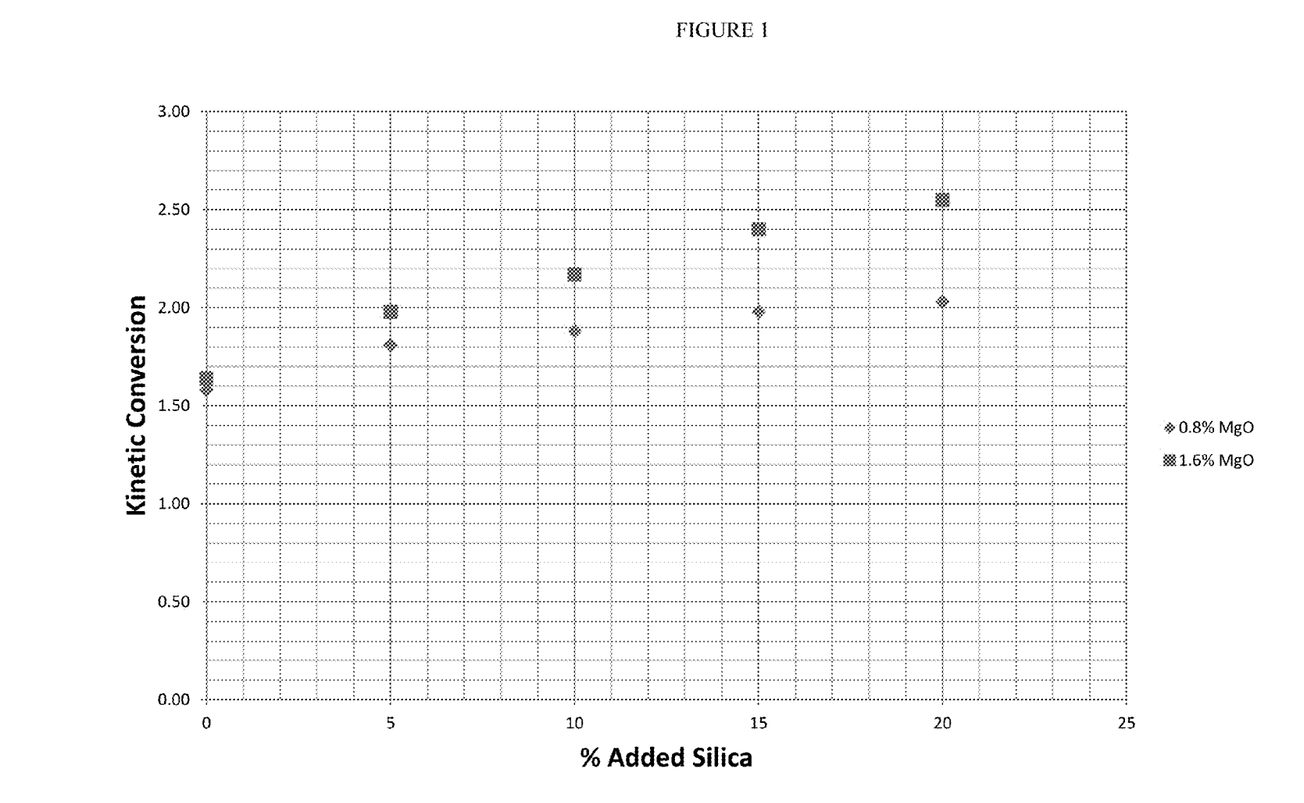
FIG. 1 is a graphic representation of the kinetic conversion as a function of the amount of added silica of catalysts in accordance with the invention as evaluated in an ACE unit for catalytic activity and hydrocarbon selectivity.
Figure 2:
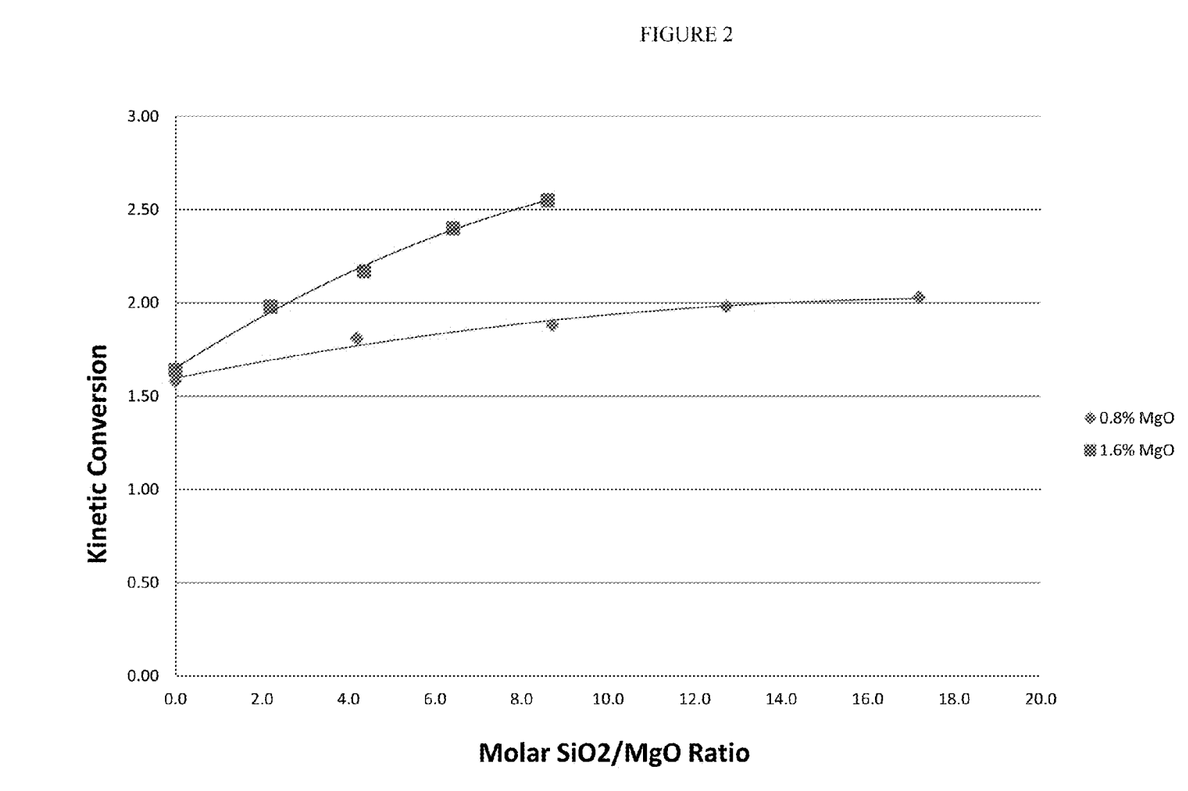
FIG. 2 is a graphic representation of the kinetic conversion as a function of the molar ratio of added silica to magnesium salt, expressed as the oxide, of catalysts in accordance the invention as evaluated in an ACE unit for catalytic activity and hydrocarbon selectivity.

The catalysts in Examples 1-4 were deactivated using a cyclic propylene steam protocol with 2000 ppm Ni+3000 ppm V. (see Lori T. Boock, Thomas F. Petti, and John A. Rudesill, ACS Symposium Series, 634, 1996, 171-183). The properties of the fresh and steamed catalyst are shown in Table 1. The data in Table 1 shows that as the $SiO_2$ increases, the steamed zeolite surface area stability improves. The samples were evaluated in the ACE unit for activity and hydrocarbon selectivity. FIG. 1 shows the kinetic conversion increases as the $SiO_2$ level increases. In addition, it shows that the 1.6 wt % MgO catalysts are more active than 0.8 wt % MgO catalyst and the advantage increases as the $SiO_2$ level increases up to 20 wt % $SiO_2$. FIG. 2 shows the kinetic conversion as a function of molar added silica to MgO ratio. The data shows that the kinetic conversion increases significantly at a ratio of about 2 and above. The interpolated hydrocarbon yields, for the 1.6 wt % MgO catalyst with 0-20 wt % added silica, are shown in Table 2. The data shows that as the added silica level in the invention increases the hydrogen, coke and gasoline yields improve.

TABLE 2

Interpolated ACE Results of Mg Containing Catalyst with Different Amounts of Added Silica

|  | Catalyst B | Catalyst D | Catalyst F | Catalyst H | Comparative Catalyst 1B |
|---|---|---|---|---|---|
| Molar Free $SiO_2/MgO$ | 2.2 | 4.4 | 6.4 | 8.6 | 0.0 |
| Kinetic Conversion (6 C/O) |  |  |  |  |  |
| Conversion | 1.98 | 2.17 | 2.40 | 2.55 | 1.64 |
| Cat-to-Oil Ratio (C/O) | 5.67 | 5.22 | 4.70 | 4.16 | 7.30 |
| Hydrogen, wt % | 0.94 | 0.9 | 0.78 | 0.62 | 0.97 |
| Total Dry Gas, wt % | 2.95 | 2.89 | 2.6 | 2.34 | 3.22 |
| Total C3's, wt % | 3.38 | 3.4 | 3.38 | 3.44 | 3.39 |
| Total C4's, wt % | 6.33 | 6.46 | 6.50 | 6.75 | 6.14 |
| C5 + Gasoline, wt % | 42.24 | 41.60 | 42.49 | 44.04 | 39.89 |
| LCO, wt % | 26.02 | 25.70 | 25.68 | 25.27 | 25.88 |
| Bottoms, wt % | 8.98 | 9.3 | 9.32 | 9.73 | 9.12 |
| Coke, wt % | 12.15 | 10.99 | 10.25 | 9.00 | 12.31 |

Preparation of the 0 wt %, 5 wt %, 10 wt %, and 15 wt % $SiO_2$ Containing MgO Catalysts Bound with Aluminum Chlorohydrol Example 6: Mg Catalyst with 5 wt % Added $SiO_2$ An aqueous slurry containing 2000 g (dry basis) of low $Na_2O$ USY zeolite, 1600 g (dry basis) of aluminum chlorohydrol, 800 g (dry basis) of large crystal boehmite alumina, 3200 g (dry basis) of Natka clay, and 400 g (dry basis) of precipitated silica (SA=130 $m^2/g$) was mixed and milled in a Drais mill. The mixture was then spray dried. The spray-dried material was calcined for 40 minutes at 400° C. The catalyst was then washed in an ammonia containing solution to remove excess sodium ions. The slurry was filtered, and cake was split in the two parts. One part was impregnated with enough $MgSO_4$ solution to result in 0.8 wt % MgO on the catalyst (Catalyst I). The other part was impregnated with enough $MgSO_4$ solution to result in 1.8 wt % MgO on the catalyst (Catalyst J). The impregnated catalysts were then oven dried at 120° C. The properties of the catalysts are shown in Table 3.

Example 7: Mg Catalyst with 10 wt % Added $SiO_2$

An aqueous slurry containing 2000 g (dry basis) of low $Na_2O$ USY zeolite, 1600 g (dry basis) of aluminum chlorohydrol, 800 g (dry basis) of large crystal boehmite alumina, 2800 g (dry basis) of Natka clay, and 800 g (dry basis) of precipitated silica (SA=130 $m^2/g$) was mixed and milled in a Drais mill. The mixture was then spray dried. The spray-dried material was calcined for 40 minutes at 400° C. The catalyst was then washed in an ammonia containing solution to remove excess sodium ions. The slurry was filtered, and cake was split in the two parts. One part was impregnated with enough $MgSO_4$ solution to result in 0.8 wt % MgO on the catalyst (Catalyst K). The other part was impregnated with enough $MgSO_4$ solution to result in 1.8 wt % MgO on the catalyst (Catalyst L). The impregnated catalysts were then oven dried at 120° C. The properties of the catalysts are shown in Table 3.

Example 8: Mg Catalyst with 15 wt % Added $SiO_2$

An aqueous slurry containing 2000 g (dry basis) of low $Na_2O$ USY zeolite, 1600 g (dry basis) of aluminum chlorohydrol, 800 g (dry basis) of large crystal boehmite alumina, 2400 g (dry basis) of Natka clay, and 1200 g (dry basis) of precipitated silica (SA=130 m²/g) was mixed and milled in a Drais mill. The mixture was then spray dried. The spray-dried material was calcined for 40 minutes at 400° C. The catalyst was then washed in an ammonia containing solution to remove excess sodium ions. The slurry was filtered, and cake was split in the two parts. One part was impregnated with enough $MgSO_4$ solution to result in 0.8 wt % MgO on the catalyst (Catalyst M). The other part was impregnated with enough $MgSO_4$ solution to result in 1.8 wt % MgO on the catalyst (Catalyst N). The impregnated catalysts were then oven dried at 120° C. The properties of the catalysts are shown in Table 3.

Example 9: Mg Catalyst with 20 wt % Added $SiO_2$

An aqueous slurry containing 2000 g (dry basis) of low $Na_2O$ USY zeolite, 1600 g (dry basis) of aluminum chlorohydrol, 800 g (dry basis) of large crystal boehmite alumina, 2000 g (dry basis) of Natka clay, and 1600 g (dry basis) of precipitated silica (SA=130 m²/g) was mixed and milled in a Drais mill. The mixture was then spray dried. The spray-dried material was calcined for 40 minutes at 400° C. The catalyst was then washed in an ammonia containing solution to remove excess sodium ions. The slurry was filtered. The cake was impregnated with enough $MgSO_4$ solution to result in 1.8 wt % MgO on the catalyst (Catalyst O). The impregnated catalyst was then oven dried at 120° C. The properties of the catalyst are shown in Table 3.

Comparative Example 2: Comparison Catalyst with No Added Silica

An aqueous slurry containing 2000 g (dry basis) of low $Na_2O$ USY zeolite, 1600 g (dry basis) of aluminum chlorohydrol, 800 g (dry basis) of large crystal boehmite alumina, and 3600 g (dry basis) of Natka clay was mixed and milled in a Drais mill. The mixture was then spray dried. The spray-dried material was calcined for 40 minutes at 400° C. The catalyst was then washed in an ammonia containing solution to remove excess sodium ions. The catalyst was dried at 120° C. Comparative Catalyst 2 was prepared by impregnating the dried catalyst with enough magnesium sulfate solution to achieve 1.8 wt % magnesium oxide in the total catalyst. The properties of the catalyst are shown in Table 3.

Example 10: ACE Evaluation of Catalysts with MgO and 0-20 wt % SiO2

Figure 3:
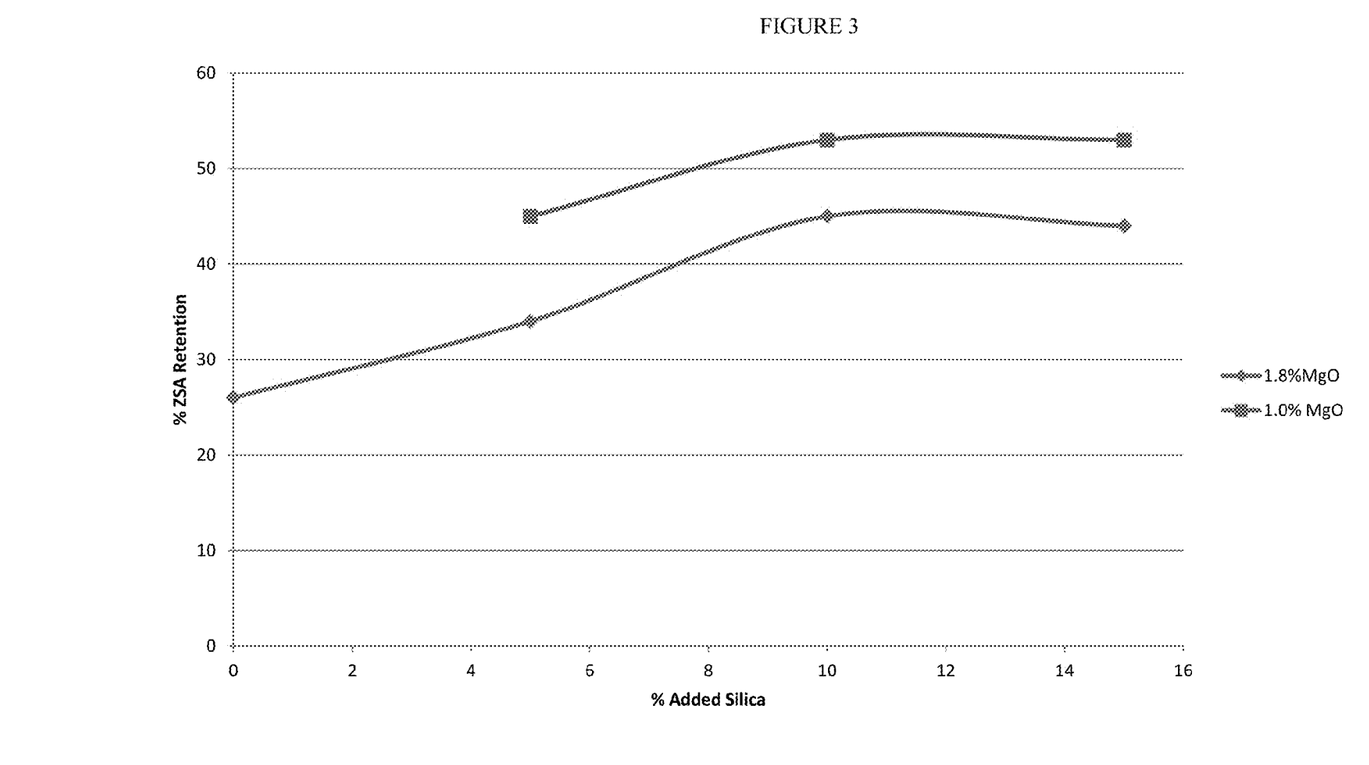
FIG. 3 is a graphic representation of the zeolite surface area stability as a function of the amount of added silica of steam deactivated catalysts in accordance with the invention as evaluated in an ACE unit for catalytic activity and hydrocarbon selectivity.

The catalysts in Examples 6-9 and Comparative Catalyst 2 were deactivated using a cyclic propylene steam protocol with 1000 ppm Ni+2000 ppm V. The properties of the fresh and steamed catalyst are shown in Table 3. The data in FIG. 3 shows that the steamed zeolite surface area stability improves as the added silica is increased to 10 wt % and then levels out. The deactivated samples were evaluated in the ACE unit for activity and hydrocarbon selectivities. The interpolated hydrocarbon yields, for the 1.8 wt % MgO catalysts with 0-20 wt % added silica, are shown in Table 4. The data shows that as the added silica level in the invention increases the hydrogen, coke and gasoline yields improve.

TABLE 4

Interpolated ACE Results of Mg Containing Catalyst with Different Amounts of Added Silica

| | Catalyst J | Catalyst L | Catalyst N | Catalyst O | Comparative Catalyst 2 |
|---|---|---|---|---|---|
| Kinetic Conversion (6 C/O) | 2.83 | 2.92 | 3.00 | 3.40 | 2.54 |
| Conversion | 72 | 72 | 72 | 72 | 72 |
| Cat-to-Oil Ratio (C/O) | 5.76 | 5.22 | 4.98 | 4.54 | 6.57 |
| Hydrogen, wt % | 0.24 | 0.19 | 0.17 | 0.16 | 0.23 |
| Total C1 + C2, wt % | 1.63 | 1.59 | 1.61 | 1.54 | 1.67 |
| Total C3's, wt % | 5.07 | 5.15 | 5.2 | 5.07 | 5.11 |
| Total C4's, wt % | 10.23 | 10.47 | 10.57 | 10.40 | 10.32 |
| C5 + Gasoline, wt % | 50.76 | 51.47 | 51.09 | 51.33 | 50.47 |
| LCO, wt % | 21.82 | 21.54 | 21.85 | 21.79 | 21.52 |
| Bottoms, wt % | 6.18 | 6.46 | 6.15 | 6.21 | 6.48 |
| Coke, wt % | 4.55 | 3.94 | 3.77 | 3.45 | 4.45 |

Example 11: Catalyst with Standard $Na_2O$ Level and MgO

Catalyst P was prepared with a USY zeolite containing 2.7 wt % $Na_2O$. A Slurry containing 25 wt % USY (2.7 wt % $Na_2O$), 20 wt % colloidal silica, 35 wt % acid peptized alumina and 20 wt % clay was milled in a Drais mill and then spray dried in a Bowen Spray dryer. The spray dried catalyst was lab muffle calcined for 40 minutes at 400° C. The calcined catalyst was washed to remove $Na_2O$. After the washing step, the filter cake was impregnated with enough $MgSO_4$ solution to result in 1.6 wt % MgO on the catalyst

TABLE 3

Chemical and Physical Properties of Mg Containing Catalyst with Different Amounts of Added Silica

| | Catalyst I | Catalyst J | Catalyst K | Catalyst L | Catalyst M | Catalyst N | Catalyst O | Comparative Catalyst 2 |
|---|---|---|---|---|---|---|---|---|
| $Al_2O_3$, wt % | 52.0 | 50.4 | 47.6 | 48.5 | 48.7 | 47.6 | 45.7 | 51.3 |
| $Na_2O$, wt % | 0.23 | 0.22 | 0.29 | 0.24 | 0.30 | 0.28 | 0.28 | 0.25 |
| $SO_4$, wt % | 3.03 | 4.74 | 3.49 | 4.70 | 3.00 | 4.59 | 3.89 | 5.22 |
| MgO, wt % | 1.02 | 1.79 | 1.13 | 1.74 | 1.11 | 1.73 | 1.54 | 1.84 |
| $RE_2O_3$, wt % | 0.04 | 0.04 | 0.04 | 0.03 | 0.03 | 0.03 | 0.03 | 0.07 |
| ZSA, m²/g | 178 | 175 | 172 | 176 | 168 | 174 | 178 | 179 |
| MSA, m²/g | 106 | 95 | 129 | 97 | 127 | 115 | 115 | 90 |
| CPS Deactivation | | | | | | | | |
| Ni ppm | 1080 | 1090 | 1090 | 1130 | 1110 | 1090 | 1140 | 1120 |
| V ppm | 2200 | 2180 | 2220 | 2230 | 2190 | 2160 | 2220 | 2430 |
| ZSA, m²/g | 80 | 60 | 91 | 80 | 89 | 76 | 80 | 47 |
| MSA, m²/g | 71 | 66 | 85 | 71 | 85 | 80 | 80 | 66 |

(Catalyst P). The properties of the catalyst are shown in Table 5. The final catalyst contains 0.30% Na2O and 25% zeolite giving 1.2% Na2O on a zeolite basis.

Example 12: Catalyst with Low Na$_2$O Level and MgO

Catalyst Q was prepared with a USY zeolite containing 0.9 wt % Na$_2$O. A Slurry containing 25 wt % USY (2.7 wt % Na$_2$O), 20 wt % colloidal silica, 35 wt % acid peptized alumina and 20 wt % clay was milled in a Drais mill and then spray dried in a Bowen Spray dryer. The spray dried catalyst was lab muffle calcined for 40 minutes at 400° C. The calcined catalyst was washed to remove Na$_2$O. After the washing step, the filter cake was impregnated with enough MgSO$_4$ solution to result in 1.6 wt % MgO on the catalyst (Catalyst Q). The properties of the catalyst are shown in Table 5. The final catalyst contains 0.15% Na2O and 25% zeolite giving 0.60% Na2O on a zeolite basis.

TABLE 5

Chemical and Physical Properties of Mg Containing Catalysts with Different Na$_2$O levels

|  | Catalyst Q | Catalyst R |
| --- | --- | --- |
| Al$_2$O$_3$, wt % | 46.6 | 45.4 |
| Na$_2$O, wt % | 0.30 | 0.15 |
| SO$_4$, wt % | 4.74 | 4.54 |
| MgO, wt % | 1.50 | 1.70 |
| RE$_2$O$_3$, wt % | 0.10 | 0.03 |
| ZSA, m$^2$/g | 143 | 158 |
| MSA, m$^2$/g | 156 | 151 |
| CPS Deactivation |  |  |
| Ni ppm | 2175 | 2150 |
| V ppm | 3440 | 3340 |
| ZSA, m$^2$/g | 67 | 87 |
| MSA, m$^2$/g | 102 | 106 |

Example 13: ACE Evaluation of Catalysts with MgO and Different Na2O Levels

The catalysts in Examples 11 and 12 were deactivated using a cyclic propylene steam protocol with 2000 ppm Ni+3000 ppm V. The properties of the fresh and steamed catalyst are shown in Table 5. The data in Table 5 shows that the steamed zeolite surface area stability improves as the Na$_2$O level is decreased from 1.2% Na2O on a zeolite basis to 0.6% Na2O on a zeolite basis. The deactivated samples were evaluated in the DCR unit for activity and hydrocarbon selectivity. The interpolated hydrocarbon yields, for the standard and low Na$_2$O catalysts stabilized with a magnesium salt and added silica, are shown in Table 6. The data shows that as the Na2O level in the invention decreases the activity and coke yield improve substantially.

TABLE 6

Interpolated ACE Results of Mg Containing Catalyst with Different Levels of Na2O

|  | Catalyst Q | Catalyst R |
| --- | --- | --- |
| Na$_2$O, wt % | 0.30 | 0.15 |
| Conversion | 70 | 70 |
| Cat-to-Oil Ratio (C/O) | 8.68 | 6.33 |
| Hydrogen, wt % | 0.15 | 0.14 |
| Total C1 + C2's, wt % | 2.69 | 2.69 |
| Total C3's, wt % | 5.01 | 5.10 |

TABLE 6-continued

Interpolated ACE Results of Mg Containing Catalyst with Different Levels of Na2O

|  | Catalyst Q | Catalyst R |
| --- | --- | --- |
| Total C4's, wt % | 9.12 | 9.28 |
| C5 + Gasoline, wt % | 47.44 | 47.78 |
| LCO, wt % | 21.60 | 21.67 |
| Bottoms, wt % | 8.40 | 8.33 |
| Coke, wt % | 5.47 | 4.82 |

What is claimed is:

1. A high matrix surface area fluid catalytic cracking catalyst having increased activity and improved selectivity for cracking a hydrocarbon feedstock to lower molecular weight products, the catalyst comprising a particulate composition comprising a zeolite having catalytic cracking activity under catalytic cracking conditions, an added silica component, a magnesium salt, clay, an alumina containing binder and optionally at least one matrix material, wherein the composition has a matrix surface area of greater than 60 m$^2$/g, wherein (1) the added silica component is either a component of matrix, if present, or is a separate component of the particulate that is not present in any clay, binder or zeolite component of the catalyst particulate, and (2) the magnesium salt is distributed throughout the particulate.

2. The catalyst of claim 1 wherein the zeolite is a faujasite zeolite.

3. The catalyst of claim 2 wherein the faujasite zeolite is a Y-type zeolite.

4. The catalyst of claim 1 wherein the added silica component is a silica component selected from the group consisting of precipitated silica, silica gel, colloidal silica, silica alumina containing greater than 60 wt % silica, and combinations thereof.

5. The catalyst of claim 4 wherein the added silica component is precipitated silica.

6. The catalyst of claim 4 wherein the added silica component is colloidal silica.

7. The catalyst of claim 4 where in the added silica component is present in an amount sufficient to provide at least about 5 wt % silica in the total catalyst composition.

8. The catalyst of claim 1 wherein the added silica component is present in an amount sufficient to provide at least about 5 wt % silica in the total catalyst composition.

9. The catalyst of claim 8 wherein the amount of the added silica component present in the catalyst is an amount sufficient to provide from about 5 wt % to about 30 wt % silica in the total catalyst composition.

10. The catalyst of claim 9 wherein the amount of the added silica component present in the catalyst is an amount sufficient to provide from about 8 wt % to about 25 wt % silica in the total catalyst composition.

11. The catalyst of claim 1 wherein the matrix surface area is greater than 80 m$^2$/g.

12. The catalyst of claim 1 wherein the amount of zeolite present in the catalyst ranges from about 10 wt % to about 50 wt % of the total catalyst composition.

13. The catalyst of claim 12 wherein the amount of zeolite present in the catalyst ranges from about 12 wt % to about 40 wt % of the total catalyst composition.

14. The catalyst of claim 1 wherein the binder is selected from the group consisting of alumina sol, peptized alumina, silica-alumina having less than 60 wt % silica and combinations thereof.

15. The catalyst of claim 14 wherein the binder is alumina sol.

16. The catalyst of claim 15 wherein the binder comprises aluminum chlorohydrol.

17. The catalyst of claim 14 wherein the binder is an acid or base peptized alumina.

18. The catalyst of claim 14 wherein the amount of binder present in the catalyst ranges from about 10 wt % to about 60 wt % of the catalyst composition.

19. The catalyst of claim 1 wherein the amount of binder present in the catalyst ranges from about 10 wt % to about 60 wt % of the catalyst composition.

20. The catalyst of claim 1 wherein the particulate composition has an added silica to magnesium oxide molar ratio of about 2 or greater than 2.

21. The catalyst of claim 20 wherein the added silica to magnesium oxide molar ratio in the particulate composition ranges from about 2 to about 40.

22. The catalyst of claim 21 wherein the added silica to magnesium oxide molar ratio in the particulate composition ranges from about 4 to about 30.

23. The catalyst of claim 1 wherein clay is present in the composition in an amount ranging from about 5 wt % to about 65 wt % of the total catalyst composition.

24. The catalyst of claim 1 wherein a matrix material selected from the group consisting of non-peptized alumina, zirconia, titania, and combinations thereof, is present in the catalyst.

25. The catalyst of claim 24 wherein the matrix material is present in the composition in an amount ranging from about 1 wt % to about 70 wt % of the total catalyst composition.

26. The catalyst of claim 1 wherein the amount of magnesium salt present in the catalyst ranges from about 0.2 wt % to about 5.0 wt %, expressed as the oxide, of the total catalyst composition.

27. The catalyst of claim 1 wherein the zeolite has a $Na_2O$ content sufficient to provide less than about 1.0 wt % $Na_2O$, on a zeolite basis, in the total catalyst composition.

28. The catalyst of claim 27 wherein the zeolite has a $Na_2O$ content sufficient to provide less than 0.7 wt % $Na_2O$, on a zeolite basis, in the total catalyst composition.

29. The catalyst of claim 1, where the particulate composition is free of rare earth metals.

30. A method of forming a catalytic cracking catalyst having a high matrix surface area, said method comprising:
   a. forming an aqueous slurry comprising at least one zeolite particle having catalytic cracking activity under catalytic cracking conditions, an added silica component, an alumina containing binder, clay, and optionally at least one matrix material wherein the added silica component is either a component of matrix material, if present, or is a separate component that is not present in the clay, binder or zeolite;
   b. optionally, milling the slurry;
   c. spray drying the slurry to form catalyst particles;
   d. optionally, calcining the catalyst particles at a temperature and for a time sufficient to remove volatiles;
   e. optionally, washing the catalyst particles;
   f. contacting the catalyst particles with an aqueous solution comprising at least one soluble magnesium salt in an amount sufficient to provide a particulate catalyst composition comprising at least 0.2 wt % magnesium salt and having a matrix surface area of greater than 60 $m^2$/g;
   g. removing the particles; and
   h. drying the catalyst particles to obtain a final catalyst composition having a DI of less than 30.

31. The method of claim 30 wherein the aqueous slurry comprises zeolite particles in an amount sufficient to provide from about 10 wt % to about 50 wt % zeolite in the final catalyst composition.

32. The method of claim 30 wherein the zeolite particle is a faujasite zeolite.

33. The method of claim 30 wherein the aqueous slurry comprises the added silica component in an amount sufficient to provide at least about 5 wt % of silica in the final catalyst composition.

34. The method of claim 30 wherein the added silica component is selected from the group consisting of precipitated silica, silica gel, colloidal silica, silica sol and combinations thereof.

35. The method of claim 34 wherein the added silica component is a precipitated silica.

36. The method of claim 30 wherein the binder is selected from the group consisting of alumina sol, peptized alumina, silica-alumina having less than 60 wt % silica and combinations thereof.

37. The method of claim 36 wherein the binder comprises an alumina sol.

38. The method of claim 37 wherein the binder is aluminum chlorohydrol.

39. The method of claim 36 wherein the binder comprises an acid or base peptized alumina.

40. The method of claim 30 wherein the binder is present in the slurry in an amount sufficient to provide about 10 wt % to about 60 wt % binder in the final catalyst composition.

41. The method of claim 30 wherein the magnesium salt is selected from the group consisting of nitrates, acetates, sulfates, chlorides and combinations thereof.

42. The method of claim 30 wherein the catalyst particles are calcined prior to being contacted with the aqueous solution containing a soluble magnesium salt.

43. The method of claim 30 wherein the particulate catalyst composition has an added silica to magnesium oxide molar ratio of about 2 or greater than 2.

44. The method of claim 43 wherein the added silica to magnesium oxide molar ratio in the particulate catalyst composition ranges from about 2 to about 40.

45. The method of claim 30 wherein clay is present in the slurry in an amount sufficient to provide from about 5 wt % to about 65 wt % clay based on the total weight of the final catalyst composition.

46. The method of claim 30 wherein a matrix material selected from the group consisting of non-peptized alumina, zirconia, titania and combinations thereof, is present in the catalyst composition.

47. The method of claim 46 wherein the matrix material is present in the slurry in an amount sufficient to provide from about 1 wt % to about 70 wt % in the final catalyst composition.

48. The method of claim 30 wherein the amount of magnesium salt in the aqueous solution is an amount sufficient to provide from about 0.2 wt % to about 5.0 wt %, based on the total weight of the catalyst composition, of magnesium salt, expressed as the oxide, in the final catalyst composition.

49. The method of claim 30 wherein the zeolite of the zeolite particles has a $Na_2O$ content sufficient to provide less than 1.0 wt % $Na_2O$, on a zeolite basis, in the total catalyst composition.

50. The method of claim 49 wherein the zeolite has a $Na_2O$ content sufficient to provide less than 0.7 wt % $Na_2O$, on a zeolite basis, in the total catalyst composition.

51. The method of claim 30, where the particulate catalyst composition is free of rare earth metals.

52. A method of catalytic cracking a hydrocarbon feedstock into lower molecular weight components, said method comprising contacting a hydrocarbon feedstock with a cracking catalyst at elevated temperature whereby lower molecular weight hydrocarbon components are formed, said cracking catalyst comprising the composition of claim 1.

53. The method of claim 52 wherein the zeolite is a faujasite zeolite.

54. The method of claim 53 wherein the zeolite is a Y type zeolite.

55. The method of claim 52 further comprising recovering the cracking catalyst from said contacting step and treating the used catalyst in a regeneration zone to regenerate said catalyst.

56. The method of catalytic cracking a hydrocarbon feedstock into lower molecular weight components according to claim 52, said method comprising contacting a hydrocarbon feedstock with a cracking catalyst at elevated temperature whereby lower molecular weight hydrocarbon components are formed, wherein the added silica component of the cracking catalyst is a silica component selected from the group consisting of precipitated silica, silica gel, colloidal silica, silica alumina containing greater than 60 wt % silica, and combinations thereof.

57. The method of catalytic cracking a hydrocarbon feedstock into lower molecular weight components according to claim 52, said method comprising contacting a hydrocarbon feedstock with a cracking catalyst at elevated temperature whereby lower molecular weight hydrocarbon components are formed, wherein the added silica component is present in an amount sufficient to provide at least about 5 wt % silica in the total catalyst composition.

58. The method of catalytic cracking a hydrocarbon feedstock into lower molecular weight components according to claim 52, said method comprising contacting a hydrocarbon feedstock with a cracking catalyst at elevated temperature whereby lower molecular weight hydrocarbon components are formed, said cracking catalyst having an added silica to magnesium oxide molar ratio of about 2 or greater than 2.

* * * * *